Nov. 13, 1928.
D. J. BRIMM, JR
1,691,376
STABILIZER ADJUSTING MECHANISM
Filed March 10, 1927
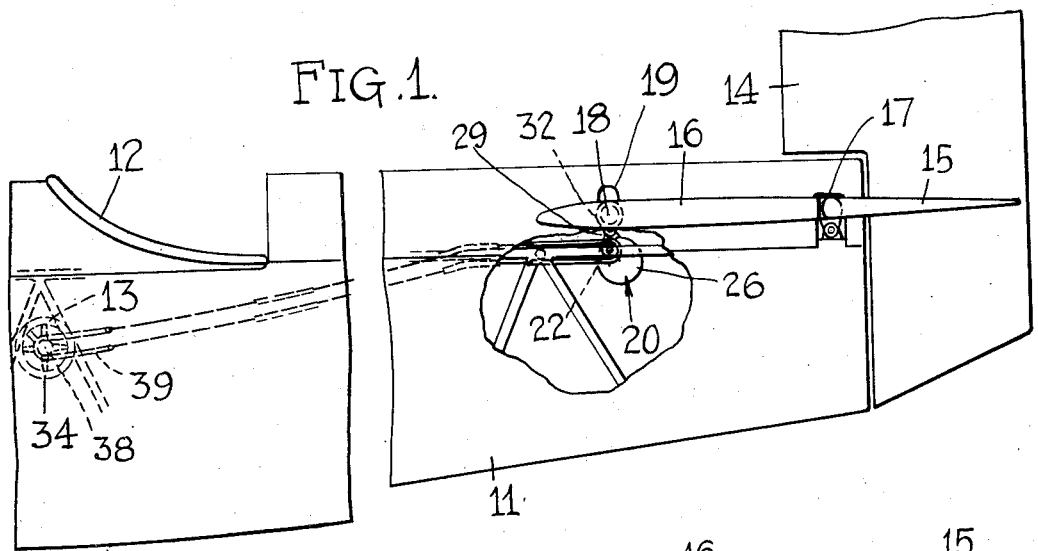
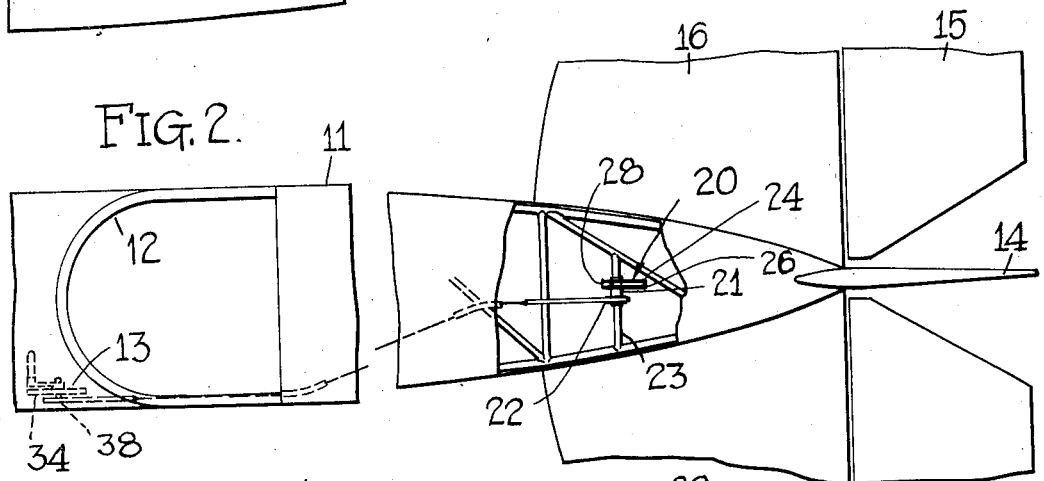
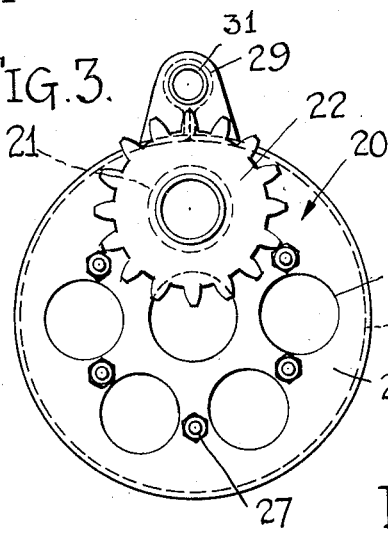
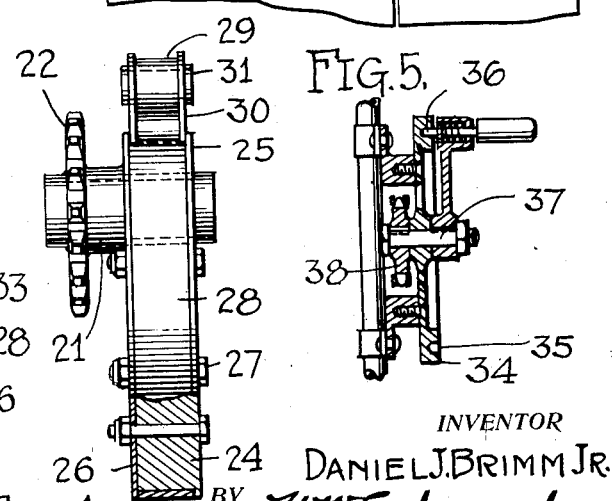
INVENTOR
DANIEL J. BRIMM JR.
BY
ATTORNEY Patented Nov. 13, 1928.

1,691,376

UNITED STATES PATENT OFFICE.

DANIEL J. BRIMM, JR., OF WEST HEMPSTEAD, NEW YORK, ASSIGNOR TO IRELAND AIRCRAFT INC., A CORPORATION OF NEW YORK.

STABILIZER-ADJUSTING MECHANISM.

Application filed March 10, 1927. Serial No. 174,215.

My invention relates to aircraft and is more particularly concerned with the stabilizer adjusting mechanism thereof.

An object of the invention is to provide, in aircraft, a stabilizer adjusting mechanism which is simple and positive in operation, which is inexpensive to manufacture, which is easily installed, which is wholly enclosed within the fuselage or body of the machine, and which is freely operable from a point in convenient proximity to the pilot's seat.

A further object of the invention is to provide, in stabilizer adjusting mechanism, a rotatable eccentric over which is loosely arranged a non-rotatable band, said band being held against rotation by its attachment to said stabilizer and being movable under the influence of said eccentric to adjust said stabilizer as said eccentric is rotated.

Other objects and advantages of the invention will be hereinafter disclosed.

In the drawings, wherein like reference characters denote like or corresponding parts, Fig. 1 is a side elevation of the rear end portion of an aeroplane fuselage showing the stabilizer adjusting mechanism mounted therein;

Fig. 2 is a plan view of the structure illustrated in Fig. 1;

Fig. 3 is a side elevation of the eccentric forming a part of said mechanism;

Fig. 4 is a front end elevation of the structure illustrated in Fig. 3, and

Fig. 5 is a transverse vertical sectional view of the locking ring and operating lever by means of which the stabilizer is adjusted.

In the embodiment of the invention selected for illustration an aeroplane fuselage of more or less conventional form is shown. Said fuselage has formed therein a cockpit 11 within which the operating lever 13 of the stabilizer adjusting mechanism is enclosed. At its rear end said fuselage 11 has attached thereto a vertical rudder 14, elevators 15, and a horizontal stabilizer 16, the latter, as indicated in Fig. 2, being extended out on opposite sides of the fuselage. The stabilizer 16, at or near its trailing edge, is pivoted as at 17, and at or near its leading edge is provided with a cross-frame member 18 as shown. Said frame member 18 is preferably carried across the fuselage 11 thru openings 19 formed in the opposite sides thereof.

The stabilizer adjusting mechanism, as previously stated, is wholly enclosed within the fuselage or body 11. It comprises an eccentric 20 having formed therein at one side thereof a sleeve 21 to which is attached a sprocket 22. Thru said sleeve 21 which, with respect to the eccentric 22, is decidedly off center, one of the cross-frame members 23 of the fuselage is extended and, since the eccentric, the sprocket and the sleeve rotate as a unit about said cross-frame member, said cross-frame member will be hereinafter referred to as a shaft. The eccentric 20 preferably comprises a main body portion 24 having formed thereon an annular flange 25, and a face plate 26 bolted to said body portion as at 27. Between said face plate 26 and the flange 25 formed on said body portion, a band 28 is arranged. This band 28 completely encircles said eccentric and is adapted to ride loosely thereon as said eccentric is rotated. By means of an upstanding portion 29 formed upon said band, and reinforced as indicated at 30, said band is pivotally fastened as at 31 to the cross-frame member 18 (or rather to a fitting 32 mounted thereon) of the stabilizer. If desired, lightening holes 33 may be formed in both the face plate 26 and the body portion 24 of the eccentric.

The operating mechanism whereby the eccentric 20 is rotated comprises in addition to the operating lever 13 a suitable locking ring 34. Said ring has formed therein a plurality of equidistantly spaced openings or depressions 35 within which a latch bar 36 slidable in the handle of the operating lever 13 is adapted to engage. Said operating lever is movable about an axis coincident with the center of said ring and, as illustrated in Fig. 5, is mounted on a shaft 37 which may, if desired, be journaled in a suitable bracket fastened to the side wall of the fuselage. Said shaft moreover, has mounted thereon a sprocket 38 over which a chain 39 is fitted. By extending said chain rearwardly within the fuselage and over the sprocket 22 of the eccentric 20, the latter, as indicated in Fig. 1, is so connected with the operating lever 13 as to cause it (the eccentric) to be roated as said lever 13 is turned.

In operation, and assuming that it is desired to set the stabilizer 16 at either a negative or positive angle of incidence, such setting may be readily obtained thru the operation of said lever. By turning said lever in one direction, the stabilizer is given a negative setting whereas by turning the lever in the opposite direction said stabilizer is given a positive setting, the setting in each instance, being controlled by the action of the eccentric 20. As said eccentric 20 is rotated, the encircling band 28 mounted thereon is moved either up or down, and since said band is directly fastened to the stabilizer 16, said stabilizer is correspondinly adjusted.

While I have described my invention in detail in its present preferred embodiment, it will be obvious to those skilled in the art after understanding my invention that various changes and modifications may be made therein without departing from the spirit or scope thereof. I aim in the appended claims to cover all such modifications and changes.

What I claim is:

1. The combination, in an aeroplane, of a fuselage skeleton including a horizontally extending upper cross-frame member, an adjustable horizontal stabilizer mounted above said fuselage skeleton and including as a structural element thereof a beam, a fitting mounted on said beam directly above said cross-frame member, a sleeve mounted for rotation on said frame member, an eccentric and a sprocket carried by said sleeve, a band loosely encircling said ecentric, ears formed upon said band, a direct pivotal connection between said ears and said fitting, and means engaging said sprocket to rotate said sleeve and said eccentric to thereby adjust the stabilizer.

2. The combination, in an aeroplane, of a fuselage, an adjustable horizontal stabilizer mounted thereon, a horizontally extending fuselage frame member mounted beneath said stabilizer, a sleeve rotatable about said frame member, an eccentric carried by said sleeve, outwardly extending annular flanges formed upon said eccentric, a band loosely encircling said eccentric between said flanges, ears formed upon said band, a direct pivotal connection between said ears and said stabilizer for adjusting the latter as said sleeve is rotated, and means for rotating said sleeve.

In testimony whereof I hereunto affix my signature.

DANIEL J. BRIMM, Jr.